US011762111B2

(12) United States Patent
Hesse et al.

(10) Patent No.: US 11,762,111 B2
(45) Date of Patent: Sep. 19, 2023

(54) MACROPIXEL AND MACROPIXEL-BASED PARTICLE AND RADIATION DETECTOR

(71) Applicant: Technische Universität Darmstadt, Darmstadt (DE)

(72) Inventors: Markus Hesse, Darmstadt (DE); Tina Ebert, Darmstadt (DE); Gabriel Schaumann, Darmstadt (DE); Markus Roth, Griesheim (DE)

(73) Assignee: Focused Energy GmbH, Darmstadt (DE)

(*) Notice: Subject to any disclaimer, the term of this patent is extended or adjusted under 35 U.S.C. 154(b) by 28 days.

(21) Appl. No.: 17/625,402

(22) PCT Filed: Jul. 7, 2020

(86) PCT No.: PCT/EP2020/069137
§ 371 (c)(1),
(2) Date: Jan. 7, 2022

(87) PCT Pub. No.: WO2021/005065
PCT Pub. Date: Jan. 14, 2021

(65) Prior Publication Data
US 2022/0221599 A1 Jul. 14, 2022

(30) Foreign Application Priority Data
Jul. 8, 2019 (DE) .......................... 10 2019 118 423

(51) Int. Cl.
*G01T 1/29* (2006.01)
(52) U.S. Cl.
CPC ................................. *G01T 1/2914* (2013.01)

(58) Field of Classification Search
CPC ...................................................... G01T 1/2914
See application file for complete search history.

(56) References Cited

U.S. PATENT DOCUMENTS

| 8,258,483 B1* | 9/2012 | Boatner ................. C23C 14/48 250/367 |
| 2009/0114823 A1 | 5/2009 | Pychlau et al. |

(Continued)

FOREIGN PATENT DOCUMENTS

| EP | 2056127 A2 | 5/2009 |
| WO | 2012011914 A1 | 1/2012 |

OTHER PUBLICATIONS

Bolton, P.R. et al., Instrumentaiton for diagnostics and control of laser-accelerated proton (ion) beams. In: Physica Medica, vol. 30, 2014, pp. 255-270.

(Continued)

*Primary Examiner* — Hugh Maupin
(74) *Attorney, Agent, or Firm* — Smartpat PLC

(57) ABSTRACT

An arrangement for determining an energy spectrum of a beam of radiation or particles is disclosed. The arrangement comprises a plurality of polymeric bodies. Each of the plurality of polymeric bodies includes an optical waveguide. Each of the plurality of polymeric bodies has a scintillator disposed at a respective end of the optical waveguide. The scintillators are arranged relative to each other such that an energy resolution of a particle beam incident on the arrangement can be determined. Furthermore, a particle detector with the arrangement and an evaluation unit for reading out the particle detector are disclosed.

13 Claims, 2 Drawing Sheets

(56) References Cited

U.S. PATENT DOCUMENTS

| | | | |
|---|---|---|---|
| 2010/0213390 A1 | 8/2010 | Safai | |
| 2010/0288934 A1* | 11/2010 | Keppel | G01T 1/205 250/362 |
| 2015/0083923 A1* | 3/2015 | Stanton | G01T 1/202 250/367 |
| 2020/0316404 A1* | 10/2020 | Seco | G01T 1/201 |

OTHER PUBLICATIONS

Englbrecht, F.S. et al., An online, radiation hard proton energy-resolving scintillator stack for Laser-driven proton bunches. In: Radiation Protection Dosimetry, vol. 180, No. 1-4, 2018, pp. 291-294.

Green, J.S. et al., Scintillator-based ion beam profiler for diagnosing laser-accelerated ion beams. In: Proceedings of SPIE—The International Society for Optical Engineering, 8079, 807919, 2011.

Metzkes, J. et al., A scintillator-based online detector for the angularly resolved measurement of laser-accelerated proton spectra. In: Review of Scientific Instruments, vol. 83, 123301, 2012.

Metzkes, J. et al., An online, energy-resolving beam profile detector for laser-driven proton beams. In: Review of Scientific Instruments, vol. 87, 083310, 2016.

\* cited by examiner

MACROPIXEL AND MACROPIXEL-BASED PARTICLE AND RADIATION DETECTOR

TECHNICAL FIELD

Embodiments relate to concepts for detecting particles and/or radiation and related applications, and in particular to an arrangement, for example a macropixel, for determining a spatially resolved energy spectrum of a particle or radiation beam, and a particle detector comprising the arrangement. Embodiments also relate in particular to a device for spatial and spectral ion diagnostics.

BACKGROUND

The development of new high-power laser systems in the petawatt range for laser particle acceleration requires new and further development of existing detectors. In particular, because of the ever-increasing repetition rates of a few thousandths of a second to minutes, there is a need for high readout speed and multiple usability.

Currently used detectors for studying accelerated ions in spectral (i.e. energetic) as well as in spatial dimensions are not reusable without time-consuming exchange of sub-elements, cannot be operated in an automated way or cover only one of the two sub-areas.

SUMMARY

Therefore, there is a need to provide concepts for multiple-use detectors. Nevertheless, it is desirable to save costs in the process.

Such a need may be met by the subject matter of the claims.

According to a first aspect, an arrangement for determining an energy spectrum of a particle beam is provided. The arrangement comprises a plurality of polymeric bodies. Each of the plurality of polymeric bodies comprises an optical fiber. Each of the plurality of polymeric bodies has a scintillator disposed at a respective end of the optical fiber. The scintillators are arranged relative to each other such that an energy distribution of a particle beam incident on the arrangement can be determined. At the same time, for example, the 3D location profile can be mapped optically.

By using scintillators, a detector in which this arrangement is used can be used repeatedly and permanently when interacting with ionized particles. By reusing the detector, ongoing costs are replaced by one-time costs, thereby minimizing overall costs.

For example, the optical fibers of the plurality of polymeric bodies may have different lengths. For example, respective beginnings (or ends) of the optical fibers may be aligned on a common plane such that the scintillators are at different distances from the common plane. This means that the path lengths of the particles of the particle beam until they hit the scintillators from the opposite side are different. As explained below, an energy resolution of the particles in the particle beam can be achieved via an appropriately chosen embedding matrix. Here, the penetration depth of the particles is proportional to their energy.

For example, the arrangement can be a macropixel of a detector. For example, the arrangement of a plurality of polymeric bodies with optical fibers of different lengths can result in a so-called macropixel. These intrinsically functional individual detectors in an arrangement result in a spatially resolving detector.

For example, the plurality of polymeric bodies are cylindrical (the cross-section may be circular or a polygon). For example, they may be arranged parallel to each other.

For example, the scintillators and the optical waveguides may be of the same (base) polymer material. For example, the base polymer material may be a polymethyl methacrylate, PMMA, also called acrylic glass. This is a transparent thermoplastic. The polymer material for the scintillators can be doped according to a scintillation effect. For example, a content of doped PMMA in the respective scintillators can be substantially 40%. The doping is achieved, for example, by deliberately introduced impurities (e.g. certain nanoparticles). These impurities are designed, for example, to excite light upon impact of ions, which is guided along the light guides to an exemplary camera. Different types of dopant material enable targeted optimization for detection of different types of radiation and particles, such as ions, electrons, neutrons, and others.

The use of polymers for activation reduction leads to easier handling in experiments as the time to fade away can be minimized.

For example, the arrangement may comprise a connected polymeric holding or support structure. For example, the plurality of polymeric bodies is embedded in the polymeric support structure.

For example, the support structure can be made up of individual layers. The individual layers can be layered in the longitudinal direction of the optical waveguides. The support structure may define an external dimension of the arrangement. For example, the support structure is essentially a cuboid. This may (completely) surround/enclose the plurality of polymeric bodies. It is understood that for the formation of the light guide in the support structure a refractive index should be chosen differently (the light guide should be optically denser). This can also be achieved by appropriate doping/contamination of the polymer base material. In particular, it is possible that the support structure, the light guides and the scintillators have the same base material and differ only with respect to their doping or lack of doping. Thus, the energy loss per unit length of the incoming radiation or particles is nearly the same in all components.

Examples of scintillator dopants include, for example, the following substances: anthracene, stilbene, napthtaline, 2-phenyl-5-(4-biphenyl)-1,3,4-oxadiazole (PBD), 2,5-diphenyloxazole (PPO), 1,4-bis(5-phenyloxazol-2-yl)benzene (POPOP) 1,4-diphenylbenzene (p-terphenyl).

The optical fiber can also be a glass fiber. This can provide optical transport through the optical fiber in the absorber matrix (triggered by excitation of photons in the scintillator) to prevent crosstalk between energy levels (defined by the respective polymeric bodies).

The support structure can, for example, result in a layered absorber matrix. This can circumvent the problem of high aspect ratios. By microfabrication, a pixel size of an energy level (measured on a respective polymeric body) can be reduced to a few tens to a few hundreds of micrometers.

Upon penetration into the absorber matrix, the particles to be detected may lose energy (e.g., proportional to the penetration depth). A particle with a lot of energy can penetrate deep into the absorber matrix and excite one of the scintillators located farthest from a penetration surface. A particle with little energy, for example, cannot penetrate as deeply into the absorber matrix and excite the scintillator farthest from the penetration surface. That is, depending on a particle energy, different scintillators can be excited. For example, the scintillators can be arranged in the absorber matrix in such a way that different energy levels can be detected.

A number of the layers may correspond to a number of the scintillators. The integration of the scintillator in the absorber matrix may be, for example, exactly at a point of the energy to be detected to minimize blurring in energy and spatial resolution.

Optionally, the support structure comprises or consists of the same polymer base material as the scintillators and the optical fibers. The support structure may have the same or different doping as the scintillators and/or the optical fibers.

Optionally, the energy spectrum of the particle beam comprises an unknown energy distribution. In addition, a scintillator located at each end of the optical waveguide may have a diameter of less than 1 mm. Thus, a higher spatial resolution can be achieved. The scintillators may be arranged relative to each other such that the energy spectrum of a particle beam incident perpendicularly on the surface of the arrangement is determinable.

Optionally, at least some of the scintillators and/or optical waveguides and/or polymeric bodies comprise a reflective coating that is formed over the entire surface (e.g., completely enveloping) or partially. This allows incident light to be reflected and does not affect the measurement result.

Optionally, several scintillators are formed on a plane perpendicular to a light propagation in the optical fibers. In this way, macro pixels can be formed.

According to a second aspect, a particle detector is provided, The particle detector comprises the arrangement according to the first aspect.

According to a third aspect, an evaluation unit for reading out a particle detector according to the second aspect is provided.

Energy resolution and/or energy range may be variably adaptable to the experiment by number and layer thickness of the scintillator material.

For example, for particle beam generation a laser can be operated at e.g. 10 Hz and a power of 100 TW (and upwards). This can be directed e.g. at a foil (e.g. made of metal) to eject the particles (e.g. neutrons, ions) in the direction of the arrangement. This particle beam can be used e.g. to perform material measurements on walls and rocks. After beaming through the material to be measured, a particle detector according to embodiments is used to optically record the result. Internal structures of the material to be measured become visible in the energy spectrum. For example, embodiments can therefore be used for applications in large-scale research facilities.

The evaluation unit is connected to the particle detector via the optical fibers or optically reads the ends of the optical fibers over a free distance. This allows the e.g. electronic evaluation unit to be placed at a large EMP (electromagnetic pulse) safe distance from the interaction point.

The evaluation unit can further comprise a camera system with which an acquisition of the energy spectra with spatial resolution can be performed. Furthermore, a fast camera system can be provided, which is designed for at least one repetition rate of high energy laser systems and can comprise extensions such as image intensification (e.g. MCPs, diodes, photomultipliers).

It is understood by the skilled person that the evaluation units set forth herein may be implemented using hardware circuitry, software means, or a combination thereof. The software means may be related to programmed microprocessors or a general computer, an ASIC (Application Specific Integrated Circuit) and/or DSPs (Digital Signal Processors). For example, the evaluation unit may be partially implemented as a computer, a logic circuit, a field programmable gate array (FPGA), a processor (e.g., comprising a microprocessor, a microcontroller (µC), or a vector processor)/core: A processor (e.g. comprising a microprocessor, a microcontroller (µC) or a vector processor)/core (may be integrated in the processor or used by the processor)/CPU (central processing unit; where several processor cores are possible), an FPU (floating point unit): Floating Point Unit), an NPU (Numeric Processing Unit), an ALU (Arithmetic Logical Unit), a coprocessor (additional microprocessor to support a main processor (CPU)), a GPGPU (General Purpose Computation on Graphene): General Purpose Computation on Graphics Processing Unit), a parallel computer (for the simultaneous execution, among other things on several main processors and/or graphics processors, of computing operations) or a DSP. It is understood by the skilled person that even if the details described herein are described with respect to a method, these details may also be realized in a suitable device, a computer processor or a memory connected to a processor, the memory being provided with one or more programs that perform the method when executed by the processor. Procedures such as swapping and paging may be used.

Although some of the aspects described above are related to the arrangement, these aspects may also apply to the detector and the evaluation unit. Likewise, the aspects described above with respect to the detector may apply in a corresponding manner to the arrangement and the evaluation unit. Likewise, the aspects described above with respect to the evaluation unit may apply in a corresponding manner to the arrangement and the detector.

It is also understood that the terms used herein merely serve to describe individual embodiments and are not intended to be limiting. Unless otherwise defined, all technical and scientific terms used herein shall have the meaning corresponding to the general understanding of a person skilled in the art relevant to the present disclosure; they shall be defined neither too broadly nor too narrowly. If present technical terms are used incorrectly and thus do not express the technical idea of the present disclosure, they are to be replaced by technical terms which convey a correct understanding to the person skilled in the art. The general terms used herein are to be interpreted on the basis of the definition found in the dictionary or according to the context; too narrow an interpretation is to be avoided.

It is to be understood that terms such as "include" or "have", etc., mean the presence of the described features, numbers, operations, actions, components, parts or combinations thereof and do not exclude the presence or possible addition of one or more further features, numbers, operations, actions, components, parts or combinations thereof.

Although terms like "first" or "second" etc. may be used to describe different components, these components are not to be limited to these terms. The above terms are merely intended to distinguish one component from another. For example, a first component may be referred to as a second component without departing from the scope of protection of the present disclosure; likewise, a second component may be referred to as a first component. The term "and/or" includes both combinations of the plurality of items associated with each other and each item of this plurality of items described.

In the present context, if it means that a component "is connected to", "is in communication with", or "accesses" another component, it may mean that it is directly connected to or directly accesses it; however, it should be noted that another component may be interposed. If, on the other hand, it is said that a component is "directly connected" to another component or "directly accesses" it, this is to be understood as meaning that no further components are present in-between.

Preferred embodiments of the present disclosure are described below with reference to the accompanying drawings. The same or identical components or elements are always provided with the same or similar reference signs. In the description of the present disclosure, detailed explanations of known associated functions or constructions are omitted insofar as they unnecessarily detract from the meaning of the present disclosure. The accompanying drawings of the present disclosure serve to illustrate the present disclosure and are not to be construed as limitations.

BRIEF DESCRIPTION OF THE DRAWINGS

Further objectives, features, advantages and application possibilities result from the following description of non-restrictive embodiment examples with reference to the associated drawings. Thereby, all described and/or pictorially depicted features individually or in any combination show the object disclosed herein, also independent of their grouping in the claims or their back-relationships. The dimensions and proportions of the components shown in the figures are not necessarily to scale; they may differ from those illustrated here in embodiments to be implemented.

DETAILED DESCRIPTION

The arrangement and detector will now be described with reference to embodiments.

Specific details are set forth below, but not limited thereto, to provide a complete understanding of the present disclosure. However, it will be apparent to one skilled in the art that the present disclosure may be used in other embodiments which may differ from the details set forth below.

It will be understood that when one element is referred to as being "connected" or "coupled" to another element, the elements may be connected or coupled directly or through one or more intermediate elements. When two elements A and B are connected with an "or", this is intended to be understood as disclosing all possible combinations, i.e., A only, B only, and A and B. An alternative wording for the same combinations is "at least one of A and B". The same applies to combinations of more than 2 elements.

Figure 1:
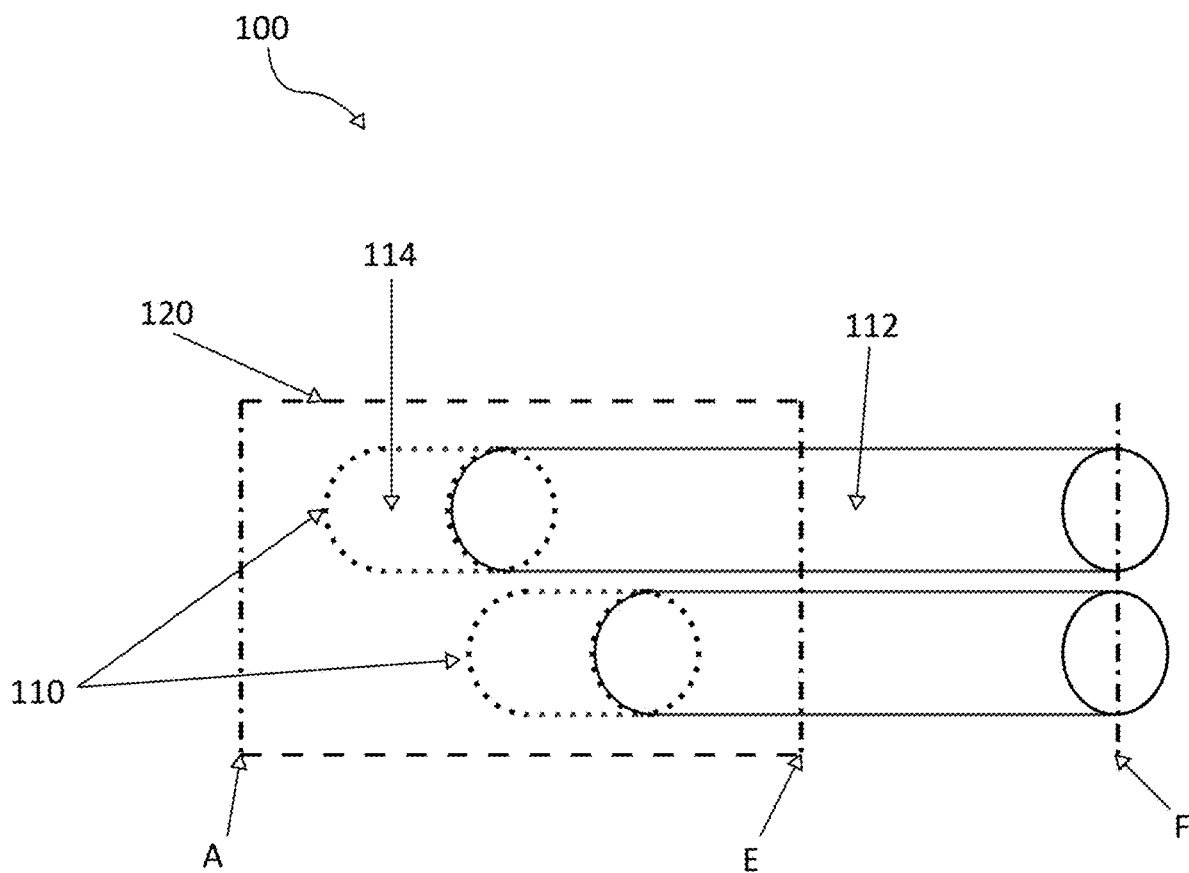
FIG. 1 shows a schematic representation of an arrangement for a detector.

FIG. 1 shows a schematic representation of an arrangement for a detector. The arrangement (100) is configured to determine an energy resolution of a particle beam. The arrangement (100) comprises a plurality of polymeric bodies (110). These polymeric bodies (110) are schematically shown as cylinders and may comprise a plurality of sections. One section may be a scintillator (114). Another section may be the optical fiber (112). Each of the plurality of polymeric bodies (110) includes at least one optical fiber (112) and at least one scintillator (114) disposed at a respective end of the optical fiber (112).

For example, the use of scintillators may result in the detector being able to be used in a sustainable manner, as these can be used permanently, unlike disposable detectors, and are also safe from the influence of electromagnetic pulses (EMP). In addition, the type of scintillator can define the type of radiation or particle to be detected.

Each of the polymeric bodies may include exactly one scintillator (114) and exactly one optical fiber (112). The polymeric bodies (110) may be cylindrical or polygonal, and the respective portions (e.g., the optical waveguide (112) and the scintillator (114)) may be both cylindrical and polygonal. For example, the optical fiber (112) and the scintillator (114) have the same diameter. In particular, each of the plurality of polymeric bodies (110) may have a scintillator (114) at one end and an optical waveguide (112) at the corresponding other end. In this regard, the length of each polymeric body (110) may be determined by the respective optical fiber (112) if the same scintillator (114) is used for each polymeric body (110). Similarly, the length of the scintillator may affect the length of the polymeric body (110).

The scintillators (114) may be arranged relative to each other such that an energy resolution of a particle beam incident on the arrangement (100) is determinable. In FIG. 1, a polymer support structure (120) is schematically shown. This polymer support structure (120) may have several layers. The polymer support structure (120) may further be continuous. Here, the polymer support structure (120) may have a first surface (E) and a second surface (A). The plurality of polymeric bodies (110) may extend in the contiguous polymeric support structure (120) from the first surface (E) toward the second surface (A). For example, only a single one of the plurality of polymeric bodies (110) may terminate at the second surface (A) or the polymeric support structure may form the second surface (A) over the entire surface. For example, in FIG. 1, the left side may represent the second surface (A) and the right side may represent the first surface (E). The first surface (E) may represent a common surface, at respective ends of which the optical fibers (112) are disposed. However, as further shown in FIG. 1, the optical fibers (112) may also protrude from the first surface (E) of the polymer support structure (120) and terminate together at a third surface (F). Thus, in particular, surface (E) and surface (F) may also coincide. The cylindrical polymeric bodies (110) may be parallel to each other. For example, the cylindrical polymeric bodies (110) may extend parallel to each other from the first surface (E) (where corresponding ends or cross-sections of the optical fibers (112) are located) toward the second surface (A).

The second surface (A) can be provided for a reception of a radiation or particle beam. The third surface (F) or, for example, the polished ends of the optical waveguides (112), which protrude from the polymer support structure (120), can be provided for an evaluation unit (e.g. in the form of a camera) used for detection. The particle beam can, for example, hit the second surface (A) and lead to photon emission in the respective scintillators (114) of the polymeric bodies (110), which are detectable at the end of the respective optical waveguides (112). A different embedding depth of the scintillators (114) or the polymeric bodies (110) can be used to infer an energy distribution of the particle beam. The optical waveguides (112) transmit the information in the form of the intensity of the emitted photons of the scintillator (114) to the readout or evaluation unit (not shown).

The third surface (F) may correspond to a common plane along which the optical waveguides (112) may be aligned. Due to the different length of the optical fibers (112), the scintillators (114) may have a different distance from the common planes (E) and (F), respectively. Furthermore, the scintillators may have a different distance from the second surface (A) of the polymeric support structure (120). This distance may in turn adjust the different lengths of the optical fibers (112). A particle beam that hit a scintillator (114) farther from the second surface (A) may be more attenuated due to the polymer support structure (120) or surrounding polymer bodies (110). The further away a respective scintillator (114) is from the second surface (A), the greater the corresponding energy of the particle beam must be to trigger the excitation process.

The arrangement (100) shown in FIG. 1 may be used as a macropixel of a partial particle detector. A macropixel comprises an arrangement of a discrete number of polymeric bodies (110), each having a different distance from the second surface (A). The particle detector may itself comprise the arrangement (100). For example, a plurality of such arrangements may be used in the detector. A camera and/or an evaluation unit (which may also comprise the camera) may further be connected to the particle detector. The evaluation unit may be provided to read out the particle detector.

For example, the scintillators (114), the optical fibers (112), and/or the polymeric support structure (120) may be formed from the same polymeric material.

By using the same polymer for the polymer support structure (120), optical fiber (112), and scintillator (114) with similar absorption properties, a uniform energy attenuation of the particles to be detected can be set, which can also minimize distortion of the measurements due to particles not impinging perpendicularly on the detector.

For example, the polymeric support structure (120) may be connected or coherent. Specifically, the polymeric support structure (120) may be constructed of individual layers or may be fabricated from a block. For example, a respective layer may terminate with a respective scintillator (114). Thus, the number of scintillators (114) may correspond to the number of layers of the polymeric support structure (120) or may be higher or lower.

Light transport with polymer wave guides (112) with a diameter of a few hundred micrometers, for example smaller than 1 mm (or 500 µm or 250 µm or 150 µm) through the comparatively thick polymer support structure (120) can be made possible by the layered construction of individual support structure plates. Consequently, this can minimize the fiber diameter. For example, one of the polymeric bodies (110) may be substantially 100 µm in diameter. The shortest and longest distance of the scintillators (114) to the second surface (A) determine the minimum length of the polymeric support structure (120) and at the same time define the detectable energy range. The length of the polymeric support structure (120) corresponding to the distance between the first surface (E) and the second surface (A) can be, for example, a few millimeters to centimeters (e.g., 1 mm, 2 mm, 3 mm . . . 1 cm, 2 cm, . . . ).

Further details and aspects are mentioned in connection with the embodiments described above or below. The embodiment shown in FIG. 1 may include one or more optional additional features corresponding to one or more aspects mentioned in connection with the proposed concept or embodiments described below with reference to FIG. 2.

Figure 2:
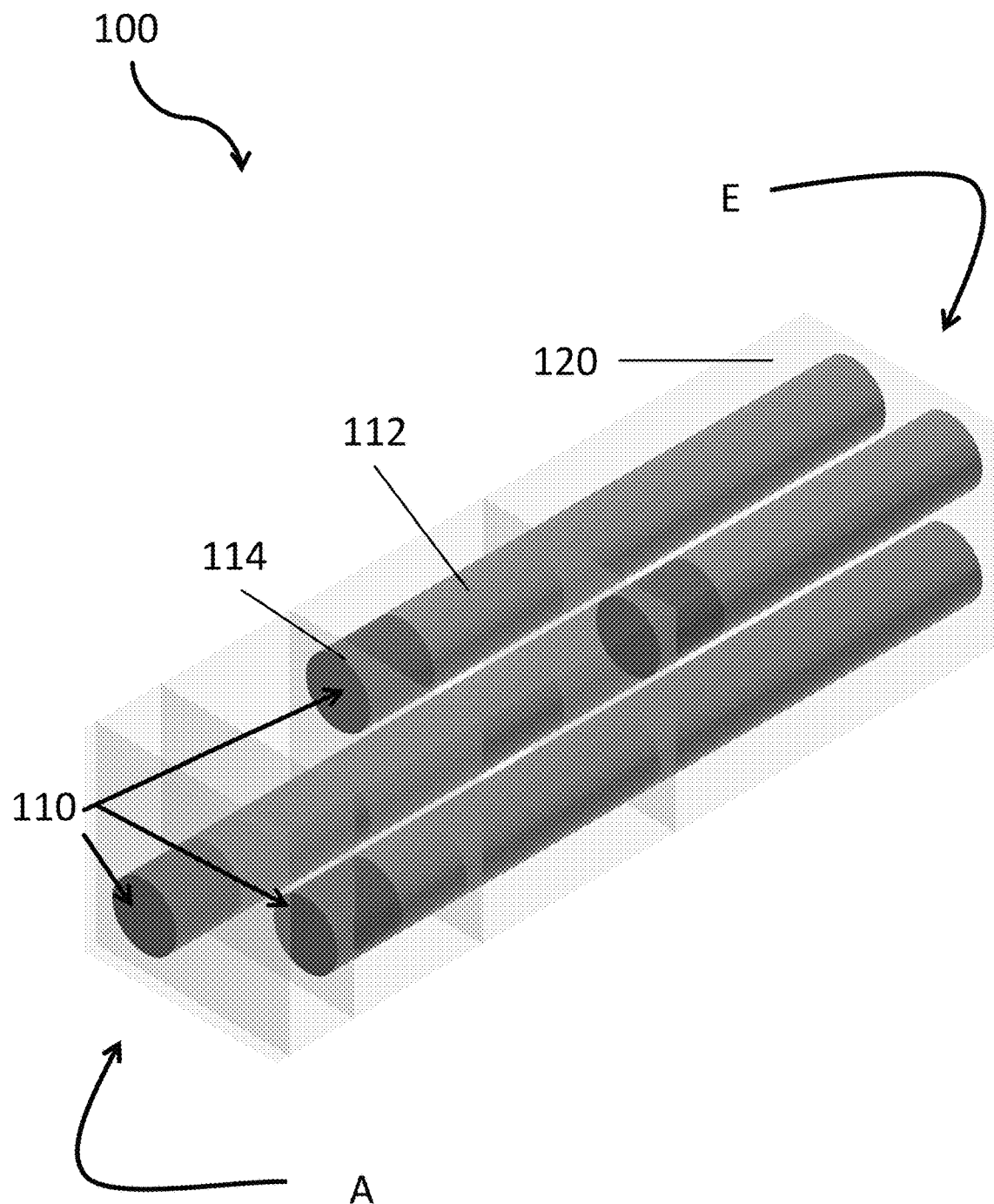
FIG. 2 shows a schematic three-dimensional representation of an arrangement for a detector.

FIG. 2 shows a schematic three-dimensional view of an arrangement (100) for a detector. The arrangement (100) is shown in FIG. 2 as a macropixel for radiation and/or particle diagnostics. Specifically, this macropixel can be used to measure four energy levels of the particle spectrum. By arranging many macro pixels next to and below each other, a spatial spectrum can be measured. The arrangement (100) or detector may be constructed of a polymer support structure (120) in which polymer optical waveguides (112) and scintillators (114) are embedded at precisely defined distances. Here, the precisely defined distances may be defined with respect to the camera-directed surface (E) or to the particle beam-directed surface (A), or to each other. The defined arrangement of scintillator (114) and optical waveguide (112) makes it possible to convert a spectral and spatial profile of accelerated particles or radiation into the optical domain and to read it out by means of an evaluation unit, for example in the form of a camera system.

According to embodiments, all macropixels may be embedded in the same support structure.

The operation of the detector can be described with the help of FIG. 2, which shows a macropixel of the detector. In each macropixel (100) a discrete energy spectrum of the particle beam can be detected. The energy resolution can be determined by the number of different scintillators poses within the macropixel (100). The energy range is determined by the shortest and longest distance of the scintillators (114) to the second surface (A).

The spatial resolution is determined by the distances between the arranged macropixels (100), the size of the second surface (A), the distances between the optical fibers (112) and the diameters of the optical fibers (112).

A particle beam incident on the macropixel is material-specifically attenuated in energy by the polymer support structure (120), passes through the polymer support structure (120) in the direction of the surface facing the camera, and deposits some or all of its energy. As the energy of the incident particle increases, the penetration depth may increase. When a particle strikes one of the scintillators (114), impact processes excite the scintillator material and the excitation energy is released in the form of photons. The farther the position of the illuminating scintillator is from the entrance surface, the greater was the energy of the incident particle. The photons generated in proportion to the number of particles are transported to the end of the polymer optical waveguide (112) to the end of the polymer support structure (120). There they can be recorded by an evaluation unit (not shown).

The size of the respective macropixel (100) can be arbitrarily adjustable, for example in length and/or width and/or height. Likewise, the number of energy levels to be detected may be adjustable, for example by the number of discrete scintillator positions relative to the second surface (A). For example, the arrangement of a plurality of macropixels (100) of the same or different structure next to and among each other can form the overall detector and thus record a spatial profile of the particle beam.

The design of the detector can be changed almost arbitrarily with respect to the total and optical waveguide size as well as the energy resolution and maximum energy without significantly increasing the development and manufacturing effort.

In addition, this avoids the need to change detector components between experiments and also reduces running costs.

By optically reading the optical fibers, which can be located at any distance from the EMP source, the evaluation unit can be protected from electromagnetic pulses, which are generated, for example, during particle acceleration with lasers. The detection of the generated photons in the detector can be implemented with commercially available camera systems. A time-resolved measurement of the spatial particle or radiation spectrum can additionally be realized if the polymer light waveguide ends are imaged onto a fast camera system.

Further details and aspects are mentioned in connection with the embodiments described above or below. The embodiment shown in FIG. 2 may have one or more optional additional features corresponding to one or more aspects mentioned in connection with the proposed concept or one or more embodiments described above (e.g., FIG. 1) or below.

According to one or more aspects, techniques for spatial and spectral radiation and particle diagnostics may be provided.

Further advantageous embodiments relate to the following articles:

An arrangement (100) for determining an energy spectrum of a particle beam having an unknown energy distribution, comprising a plurality of polymeric bodies (110), each of said plurality of polymeric bodies (110) having an optical waveguide (112) and a scintillator (114) disposed at a respective end of said optical waveguide (112) and having a diameter of less than 1 mm, said scintillators (114) being disposed relative to each other such that an energy spectrum of a particle beam incident perpendicularly on the surface A of said arrangement (100) is determinable.

It has been shown that fibers with a diameter of 2 mm and scintillators with a diameter of 1 to 5 mm limit the spatial resolution and can therefore provide less good results, but are used when the angle of incidence is variable (not perpendicular to the surface A) and thus the distances of the scintillators from the incident surface are not permanently fixed.

According to embodiments, it is not mandatory that the fibers have different lengths. They need not be aligned at the first and third surfaces (E, F). However, the defined distances of the polymeric bodies from the plane of the second surface (A) are important.

According to further embodiments, the fibers belonging to the same plane in the polymeric retaining structure (120) are bundled. Each of these bundles can then be read out separately. For this purpose, the length of the fibers may vary to allow an optimal arrangement of all readout units.

Another advantageous embodiment relates to an arrangement (100) comprising a continuous polymeric support structure (120), wherein the plurality of polymeric bodies (110) with different distances from the second surface (A) are embedded in the polymeric support structure (120) to determine an energy distribution of the particles of the particle beam by different penetration depths. In this arrangement, the different distances serve to characterize the particle beam and are therefore embedded at a defined distance from the entering surface. In contrast, in conventional arrangements the deposited energy distribution in the material is investigated, and the angle of incidence can be variable.

Another advantageous embodiment relates to an arrangement (100) in which the scintillators (114) and the optical waveguides (112) and the support structure (120) are of the same polymer base material and may have different doping. Thus, in contrast to the fiber and the scintillator, the support structure is precisely not made of a different material such as rubber or a biologically comparable material. This simplifies production and also avoids material incompatibilities or tensions between the materials. Furthermore, the energy attenuation of the incoming radiation is the same in all components.

Embodiments may optionally include at least one of the following features or functions:

particles impinge parallel to the polymeric bodies;

the base material for all components may be the same (scintillating head, fiber, and support structure);

the particle detector is designed for detection of non-monoenergetic radiation, i.e. particle beams with distinct energy distribution;

application in the following fields is possible: laser, plasma and particle physics and applications;

the particle detector can be designed for single and multi-particle detection;

energy-dependent spatial spectra can be recorded and analyzed;

a space saving between the polymeric bodies is enabled by direct fabrication;

fabrication of the arrangement can be done by direct polymerization on the fiber, no additional material is needed to connect the scintillator and the fiber;

fabrication as a two-component system is possible, in particular, no additional sheathing of the polymeric bodies is necessary;

scintillators can have any shape, they do not need to be conic;

the scintillator and/or optical waveguide and/or polymeric body can be reflectively coated (e.g. completely);

the array may be composed of macropixels, i.e., multiple scintillators may be on the same plane;

excitation of several centers may be provided simultaneously without limiting the function;

the holder or support structure may be layer-based.

A key advantage of embodiments is that the use of polymers results in low nuclear activation of the polymer. This allows for easier handling in experiments, as the amount of time to decay can be minimized.

The aspects and features mentioned and described together with one or more of the examples and figures described in detail above may further be combined with one or more of the other examples to replace a similar feature of the other example, or to additionally introduce the feature into the other example.

Further, the following claims are hereby incorporated into the detailed description, where each claim may stand alone as a separate example. Where each claim may stand alone as a separate example, it should be noted that although a dependent claim in the claims may refer to a particular combination with one or more other claims, other embodiments may also include a combination of the dependent claim with the subject matter of any other dependent or independent claim. These combinations are suggested herein unless it is indicated that a particular combination is not intended. Further, features of a claim for any other independent claim are also intended to be included, even if that claim is not made directly dependent on the independent claim.

The invention claimed is:

1. An arrangement (100) for determining an energy spectrum of a particle beam, comprising a plurality of polymeric bodies (110), each of said plurality of polymeric bodies (110) comprising
an optical waveguide (112) and
a scintillator (114) disposed at a respective end of said optical waveguide (112),
said scintillators (114) being arranged relative to each other such that an energy spectrum of a particle beam incident on said arrangement (100) is determinable, wherein the arrangement (100) comprises a continuous polymeric support structure (120), and wherein the plurality of polymeric bodies (110) are embedded at different distances from a second surface (A) in the continuous polymeric support structure (120) to enable energy resolution by different penetration depths of the particles of the particle beam, the second surface (A) being an incident surface of the particle beam.

2. The arrangement (100) according to claim 1, wherein the optical waveguides (112) of the plurality of polymeric bodies (110) have different lengths, and respective ends of the optical waveguides (112) are aligned on a common plane (E; F) such that the scintillators (114) have different distances from the common plane (E; F).

3. The arrangement (100) according to claim 1, wherein the continuous support structure (120) is built up of individual layers, which are layered in a longitudinal direction of the optical waveguides (112), so that a shortest and longest distance of the polymeric bodies (110) to a common plane (A) determines a detectable energy range.

4. The arrangement (100) according to claim 3, wherein a number of the layers is equal to or smaller or larger than a number of the scintillators (114).

5. The arrangement (100) according to claim 1, wherein the plurality of polymeric bodies (110) are cylindrical or polygonal and are arranged parallel to each other.

6. The arrangement (100) according to claim 1, wherein the scintillators (114) and the optical waveguides (112) are of the same polymer base material and comprise different doping.

7. The arrangement (100) according to claim 6, wherein the continuous support structure (120) is of the same polymer base material as the scintillators (114) and the optical waveguides (112), wherein the continuous support structure (120) has the same or different doping as the scintillators (114) and/or the optical waveguides (112).

8. The Arrangement (100) according to claim 1, wherein the energy spectrum of the particle beam has an unknown energy distribution and a scintillator (114) arranged at the respective end of the optical waveguide (112) has a diameter of less than 1 mm, and wherein the scintillators (114) are arranged relative to one another in such a way that the energy spectrum of a particle beam impinging perpendicularly on a surface (A) of the arrangement (100) can be determined.

9. The arrangement (100) according to claim 1, wherein at least some of the scintillators (114) and/or optical waveguides (112) and/or polymeric bodies (110) comprise a reflective coating which is formed over an entire surface or in part.

10. The arrangement (100) according to claim 1, wherein a plurality of scintillators (114) are formed in the optical waveguides (112) on a plane perpendicular to a light propagation.

11. A particle detector comprising at least one arrangement (100) for determining an energy spectrum of a particle beam, comprising:
a plurality of polymeric bodies (110), each of said plurality of polymeric bodies (110) comprising
an optical waveguide (112) and
a scintillator (114) disposed at a respective end of said optical waveguide (112),
said scintillators (114) being arranged relative to each other such that an energy spectrum of a particle beam incident on said arrangement (100) is determinable,
wherein each arrangement (100) is a macropixel of the particle detector and their number per unit area defines an achievable spatial resolution.

12. The particle detector according to claim 11, wherein all macropixels are embedded in the continuous support structure.

13. An arrangement (100) for determining an energy spectrum of a particle beam, comprising:
a polymer support structure (120) having a first surface (E) at one end and a second surface (A) at an opposite end; and
a plurality of polymeric bodies (110) extending from the first surface (E) towards the second surface (A), each of the polymeric bodies (110) comprising
an optical fiber (112) having one end at the first surface (E) and
a scintillator (114) disposed at an opposite end of the optical fiber (112),
wherein the scintillators (114) are arranged at different distances from the second surface (A).

* * * * *